United States Patent

Yoon

(10) Patent No.: US 9,791,737 B2
(45) Date of Patent: Oct. 17, 2017

(54) DISPLAY DEVICE

(71) Applicant: Samsung Display Co., Ltd., Yongin, Gyeonggi-Do (KR)

(72) Inventor: Won Gap Yoon, Suwon-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 90 days.

(21) Appl. No.: 14/610,463

(22) Filed: Jan. 30, 2015

(65) Prior Publication Data

US 2016/0011453 A1 Jan. 14, 2016

(30) Foreign Application Priority Data

Jul. 14, 2014 (KR) .................. 10-2014-0088230

(51) Int. Cl.
*G02F 1/1333* (2006.01)
*G02F 1/1335* (2006.01)
*G02F 1/167* (2006.01)

(52) U.S. Cl.
CPC ........ *G02F 1/133608* (2013.01); *G02F 1/167* (2013.01); *G02F 2203/01* (2013.01)

(58) Field of Classification Search
CPC ........... G02F 2203/01; G02F 1/133608; G02F 1/133308; G02F 1/133314; G02F 1/133317
USPC .................................... 361/679.01
See application file for complete search history.

(56) References Cited

U.S. PATENT DOCUMENTS

| | | | | |
|---|---|---|---|---|
| 5,712,694 A | * | 1/1998 | Taira | G02B 6/0023 349/175 |
| 2009/0310288 A1 | * | 12/2009 | Lee | G02F 1/133308 361/679.01 |
| 2012/0169959 A1 | * | 7/2012 | Wei | H05K 5/02 349/58 |
| 2012/0218696 A1 | * | 8/2012 | Kim | G02F 1/133308 361/679.01 |
| 2013/0077017 A1 | * | 3/2013 | Aoki | G02F 1/133308 349/58 |
| 2013/0148072 A1 | | 6/2013 | Jang et al. | |
| 2014/0028951 A1 | * | 1/2014 | Watanabe | G02F 1/133308 349/58 |
| 2014/0204281 A1 | * | 7/2014 | Maeda | G02F 1/133611 348/794 |
| 2014/0226081 A1 | * | 8/2014 | Tomomasa | G02F 1/133308 348/794 |
| 2015/0055316 A1 | * | 2/2015 | Ye | G02B 7/00 361/809 |

FOREIGN PATENT DOCUMENTS

| | | |
|---|---|---|
| KR | 10-2008-0095065 A | 10/2008 |
| KR | 10-2010-0025174 A | 3/2010 |
| KR | 10-2010-0058004 A | 6/2010 |

* cited by examiner

*Primary Examiner* — Joseph L Williams
*Assistant Examiner* — Christopher Raabe
(74) *Attorney, Agent, or Firm* — Robert E. Bushnell, Esq.

(57) ABSTRACT

A display device includes: a display panel; a light source configured to supply light to the display panel; a mold frame on which the display panel is disposed; and a bottom chassis on which the light source is disposed, and which is coupled to the mold frame. The mold frame includes: a base unit disposed between the display panel and the light source, and having a panel form; and a side wall portion which is bent and which extends from the base unit.

15 Claims, 3 Drawing Sheets

DISPLAY DEVICE

CLAIM OF PRIORITY

This application claims priority to and the benefit of Korean Patent Application No. 10-2014-0088230, filed on Jul. 14, 2014, with the Korean Intellectual Property Office, the disclosure of which is incorporated herein in its entirety by reference.

BACKGROUND OF THE INVENTION

Field of the Invention

The present invention relates to a display device that includes a mold frame disposed between a display panel and a light source and including a base unit provided in a panel form.

Description of the Related Art

A liquid crystal display (LCD) is a type of flat panel display (FPD), which is the most widely used these days. The LCD includes two substrates, including electrodes formed thereon and a liquid crystal layer interposed therebetween. Upon applying voltage to the electrodes, liquid crystal molecules of the liquid crystal layer are rearranged, thereby adjusting the amount of transmitted light.

A liquid crystal display (LCD), which is a passive light emitting device, includes a display panel configured to display an image and a backlight assembly configured to provide light to the display panel. The backlight assembly is classified into three types depending on the position of a light source: a direct type, an edge type, and a corner type.

Meanwhile, in order to realize a slim bezel, the bezel of the display device is becoming reduced. As a size of the bezel becomes reduced, the rigidity of the display device deteriorates. Furthermore, the display device is supported at edge portions by a structure, such as a chassis, and thus a partly inclined area may appear due to an empty space, thereby producing a non-uniform luminance.

It is to be understood that this background of the technology section is intended to provide useful background for understanding the technology and, as such disclosed herein, the technology background section may include ideas, concepts or recognitions that were not part of what was known or appreciated by those skilled in the pertinent art prior to a corresponding effective filing date of the subject matter disclosed herein.

SUMMARY OF THE INVENTION

The present invention is directed to a display device including a mold frame that is capable of stably supporting a display panel and realizing a narrow bezel.

According to an embodiment of the present invention, a display device may include: a display panel; a light source configured to supply light to the display panel; a mold frame on which the display panel is disposed; and a bottom chassis on which the light source is disposed and which is coupled to the mold frame. The mold frame may include: a base unit disposed between the display panel and the light source and having a panel form; and a side wall portion which is bent and which extends from the base unit.

The mold frame may be formed of transparent polymers.

The display panel may be disposed on the base unit.

The side wall portion may be coupled to the bottom chassis.

The display device may further include a reflective sheet disposed on the side wall portion.

The bottom chassis may have a bottom portion and a protrusion which is bent and which extends from the bottom portion.

The protrusion may be coupled to the side wall portion.

The display device may further include a reflective sheet disposed on the protrusion.

The display device may further include an optical sheet and a diffusion plate disposed between the mold frame and the light source.

At least one of the optical sheet and the diffusion plate may be mounted on the protrusion.

The display device may further include an optical sheet and a diffusion plate disposed between the mold frame and the light source.

At least one of the optical sheet and the diffusion plate may be mounted on the bottom chassis.

The mold frame may further include a supporting protrusion configured to support at least one of the optical sheet and the diffusion plate.

The display device may further include an adhesive member interposed between the mold frame and the display panel.

The adhesive member may be disposed between the base unit of the mold frame and the display panel.

According to embodiments of the present invention, a display device is capable of stably fixing a display panel, thereby exhibiting uniform luminance, and is also capable of realizing a narrow bezel that corresponds to a non-display area of a display panel.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
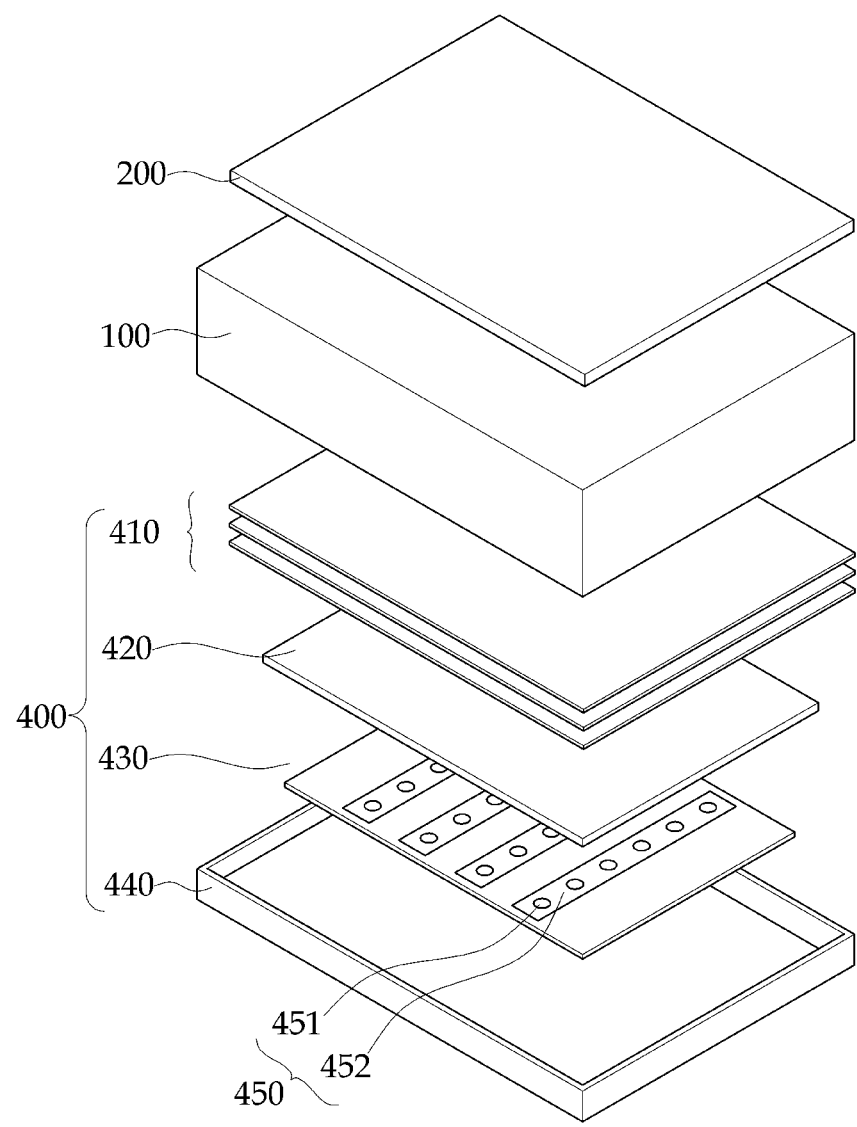
FIG. 1 is an exploded perspective view illustrating a display device according to an embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to an embodiment of the present invention will be described with reference to FIGS. 1 and 2.

FIG. 1 is an exploded perspective view illustrating a display device according to an embodiment of the present invention. FIG. 2 is a cross-sectional view illustrating the display device of FIG. 1.

Figure 2:
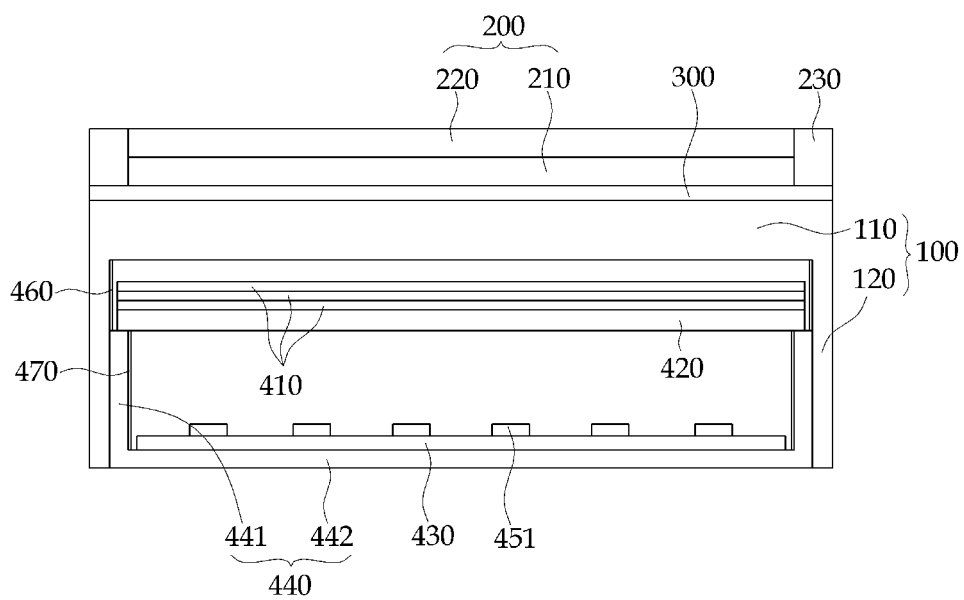
FIG. 2 is a cross-sectional view illustrating the display device of FIG. 1.

Referring to FIGS. 1 and 2, the display device includes a display panel 200 including a display area and a non-display area, a backlight assembly 400 configured to supply light to the display panel 200, and a mold frame 100 configured to accommodate the display panel 200 mounted thereon.

The display panel 200 is configured to display an image. The display panel 200 is a light-receiving type display panel and may be categorized into a liquid crystal display panel, an electrowetting display panel, an electrophoretic display panel, a microelectromechanical system display panel, and the like. It is assumed that the liquid display panel is used as an embodiment of the present invention.

The display panel 200 may be provided in a quadrilateral panel form having two pairs of sides in parallel with each other. According to an embodiment of the present invention, the display panel 200 may have a quadrilateral form having a pair of long sides and a pair of short sides. The display panel 200 includes a first substrate 210, a second substrate 220 disposed to face the first substrate 210, and a liquid crystal layer (not illustrated) interposed between the first and the second substrates 210 and 220, respectively. When viewed in a plan view, the display panel 200 has a display area on which an image is displayed and a non-display area 230 which surrounds the display area and does not display an image.

The first substrate 210 may include a plurality of pixel electrodes (not illustrated) and a plurality of thin film transistors (not illustrated) electrically connected to the plurality of pixel electrodes in one-to-one correspondence. The respective thin film transistors function as switches of driving signals supplied to the corresponding pixel electrodes. Furthermore, the second substrate 220 may include a common electrode (not illustrated) that forms an electric field controlling an arrangement of the liquid crystal with the pixel electrodes. The display panel 200 plays a role in driving the liquid crystal layer and displaying an image to the front.

The display panel 200 includes a driving chip (not illustrated) configured to supply a driving signal, a tape carrier package (TCP) on which the driving chip is mounted, and a printed circuit board (not illustrated) electrically connected to the display panel 200 through the TCP. The driving chip generates a driving signal to drive the display panel 200 in response to an external signal. The external signal refers to signals supplied from the printed circuit board and may include image signals, a variety of control signals, driving voltages, and the like.

The backlight assembly 400 includes an optical sheet 410, a diffusion plate 420, a reflective sheet 430, a bottom chassis 440, and a light source unit 450.

The light source unit 450 includes a light source 451 and a circuit substrate 452 on which the light source 451 is disposed. The light source unit 450 may be disposed under the display panel 200. For example, the light source unit 450 may be disposed on a bottom surface of the reflective sheet 430 or on a bottom surface of the bottom chassis 440.

The circuit substrate 452 has a quadrilateral form and may have reflective surfaces. For example, surfaces of the circuit substrate 452 may be coated with a material having reflectance properties. Furthermore, the circuit substrate 452 may be manufactured with a metal material to perform functions of heat dissipation and accommodation. In this case, any metal material can be used without limitation, and thus a variety of metal materials having high thermal conductivity can be used.

The light source 451 may include a light emitting diode (LED) and the like. The plurality of light sources 451 provide light for display devices to display image information. The light emitted from the light source 451 is guided toward the display panel 200 through the diffusion plate 420 and the optical sheet 410. The light sources 451 may be spaced apart from each other and have a predetermined gap in order to achieve luminance uniformity of the light source unit 450. In some embodiments, the plurality of light sources 451 may be spaced apart from each other and have a uniform gap in width and length directions in a matrix form. In some embodiments, the light sources 451 may be disposed in a row in a length direction but may be disposed in zigzag in a width direction. In some embodiments, the light sources 451 may be disposed in a row in a width direction but disposed in zigzag in a length direction. However, embodiments of the present invention are not limited thereto, and thus the light sources 451 may be disposed on the circuit substrate 452 in a variety of ways in order to achieve the luminance uniformity. Furthermore, a coupling hole (not illustrated) may be formed on the circuit substrate 452 so as to allow a coupling member (not illustrated) to be inserted and fixed thereto.

The diffusion plate 420 is disposed on the light source unit 450. The diffusion plate 420 is configured to receive light emitted from the light source unit 450 and to diffuse the light. That is, the diffusion plate 420 plays a role in improving luminance uniformity of light emitted from the light source unit 450. In more detail, the diffusion plate 420 allows a bright spot, appearing dependent on the arrangement of the light sources 451, to be invisible from the front side of the display device. Furthermore, the diffusion plate 420 may be spaced apart from the light source unit 450 and have a predetermined gap with an air layer formed therebetween.

The diffusion plate 420 is fixed to the mold frame 100 or to the bottom chassis 440. The diffusion plate 420 may be provided in a quadrilateral-plate form like the display panel 200. However, embodiments of the present invention are not limited thereto, and thus in a case where an LED is used as the light source 451, the diffusion plate 420 may be provided in many different forms and may include predetermined grooves, protrusions, or the like depending on the position of the light source 451.

The diffusion plate 420 is described as a plate for ease of description, but it may be provided in the form of a sheet or a film to achieve slimness of the display device. That is, the diffusion plate 420 is to be understood as having a concept that includes not only a plate but also a film for guiding light.

The diffusion plate 420 may be formed of a light-transmissive material including, for example, acrylic resins, such as polymethylmethacrylate (PMMA), or polycarbonate (PC), so as to guide light efficiently.

The optical sheet 410 is disposed on the diffusion plate 420 and is configured to diffuse and/or collect light transmitted from the diffusion plate 420. The optical sheet 410 may include a diffusion sheet, a prism sheet, and a protective sheet. The diffusion sheet is configured to disperse light incident from the diffusion plate 420 so as to prevent the light from being partly concentrated. The prism sheet may include prisms having a triangular cross-section and formed in a predetermined array on one surface thereof. The prism sheet is disposed on the diffusion sheet and may collect light diffused from the diffusion sheet in a direction perpendicular to the display panel 200. The protective sheet may be formed on the prism sheet and may serve to protect a surface of the prism sheet and to diffuse light to achieve a uniform light distribution.

The reflective sheet 430 is disposed between the light source unit 450 and the bottom chassis 440, and is configured to reflect light emitted downward from the diffusion plate 420 to the display panel 200, such that light efficiency is improved.

The reflective sheet 430 may be formed of, for example, polyethylene terephthalate (PET) so as to possess reflectance properties. One surface of the reflective sheet 430 may be coated with a diffusion layer containing, for example, titanium dioxide.

In some embodiments, the reflective sheet 430 may be formed of a material containing a metal, such as silver (Ag).

The bottom chassis 440 accommodates the reflective sheet 430, the diffusion plate 420, and the optical sheet 410. A bottom surface of the bottom chassis 440 is formed in parallel with the diffusion plate 420.

The bottom chassis 440 may be formed of a metal material having rigidity, such as stainless steel, or a material having good heat dissipation properties, such as aluminum or an aluminum alloy. The bottom chassis 440 according to an embodiment of the present invention is responsible for maintaining a framework of the display device and protecting a variety of elements accommodated therein.

With the above-described structure of the display device, it will be described that the mold frame 100 composed of transparent polymers stably fixes the display panel 200.

The mold frame 100 is coupled to the bottom chassis 440 and accommodates the display panel 200, the optical sheet 410, and the diffusion plate 420. The display panel 200 is disposed on the mold frame 100, and the mold frame 100 is disposed between the display panel 200 and the light source 451.

The mold frame 100 includes a base unit 110 disposed between the display panel 200 and the light source 451 and having a panel form, and a side wall portion 120 which is bent and which extends from the base unit 110.

The bottom chassis 440 has a bottom portion 442 and a protrusion 441 which is bent and which extends from the bottom portion 442.

The base unit 110 is provided in a panel form in order to stably support the display panel 200. An area of the base unit 110 is the same as or larger than an area of the display panel 200.

A rear surface of the display panel 200 is mounted on a top surface of the base unit 110 having a panel form. The base unit 110 is disposed in parallel with the bottom portion 442 of the bottom chassis 440. The base unit 110 is capable of stably supporting the display panel 200 so as to prevent the display panel 200 from being inclined in a predetermined direction.

The side wall portion 120 is coupled to the bottom chassis 440. For example, the side wall portion 120 is coupled to the protrusion 441 of the bottom chassis 440. The side wall portion 120 and the protrusion 441 of the bottom chassis 440 may be disposed in parallel with or coupled to each other in accordance with a variety of coupling structure using screws and the like.

The bottom chassis 442 accommodates the reflective sheet 430 and the light source 451.

The protrusion 441 supports the diffusion plate 420 and the optical sheet 410 disposed on the top surface thereof.

In order to realize a narrow bezel, a total thickness of the side wall portion 120 and the protrusion 441 is the same as a thickness of the non-display area 230 of the display panel 200. That is, in the display device according to an embodiment of the present invention, a length of the bezel corresponds to the non-display area 230 of the display panel 200. Unlike a conventional display device, in the display device according to an embodiment of the present invention, a bezel area is not increased due to structures such as a mold frame, a bottom chassis, and the like. Furthermore, in the display device according to an embodiment of the present invention, the bezel is realized having the same thickness as the non-display area 230 of the display panel 200, and is still capable of stably supporting the display panel 200.

Meanwhile, the mold frame 100 is disposed between the light source 451 and the display panel 200, and thus the mold frame 100 is made of a polymer material having transparent properties, such as plastics. Because the mold frame 100 is composed of transparent polymers, light emitted from the light source 451 can propagate toward the display panel 200.

In detail, the mold frame 100 may be made of at least one selected from a group of acrylic, urethane, kapton, siloxane, metalloxane polymer, polyethersulphone (PES), polycarbonate (PC), polyimide (PI), polyethyleneterephthalate (PET), polyethylenenaphthalate (PEN), polyacrylate (PAR), liquid crystalline polymer, nylon, and fiber reinforced plastic (FRP).

Meanwhile, as the mold frame 100 is made of a transparent material, a first reflective sheet 460 is disposed at the mold frame 100 in order to prevent a light leakage of the light source. The first reflective sheet 460 is disposed on an inner side surface of the side wall portion 120. That is, the first reflective sheet 460 is configured to reflect light emitted from side surfaces of the diffusion plate 420 and the optical sheet 410 so as to avoid a light leakage from the side surfaces.

Meanwhile, a second reflective sheet 470 is disposed on the protrusion 441 of the bottom chassis 440 in order to improve light extraction efficiency.

The first reflective sheet 460 disposed on the side wall portion 120 of the mold frame 100 and the second reflective sheet 470 disposed on the protrusion 441 of the bottom chassis 440 are made of the same material as the reflective sheet 430 described above.

Meanwhile, the display device according to an embodiment of the present invention further includes an adhesive member 300 interposed between the mold frame 100 and the display panel 200 in order to bond the mold frame 100 and the display panel 200.

The adhesive member 300 includes a pressure sensitive adhesive (PSA). The PSA is a substance to bond two surfaces by physical force, molecular, atomic, ionic attraction, adsorption, and the like. The PSA is a transparent adhesive member having low elasticity and excellent bonding properties.

Hereinafter, another embodiment of the present invention will be described with reference to FIG. 3. This embodiment of the present invention has the same configuration as the previously described embodiment of the present invention except for structures of mold frame 100 and bottom chassis 440. Therefore, repeated description will not be provided for ease of description.

Figure 3:
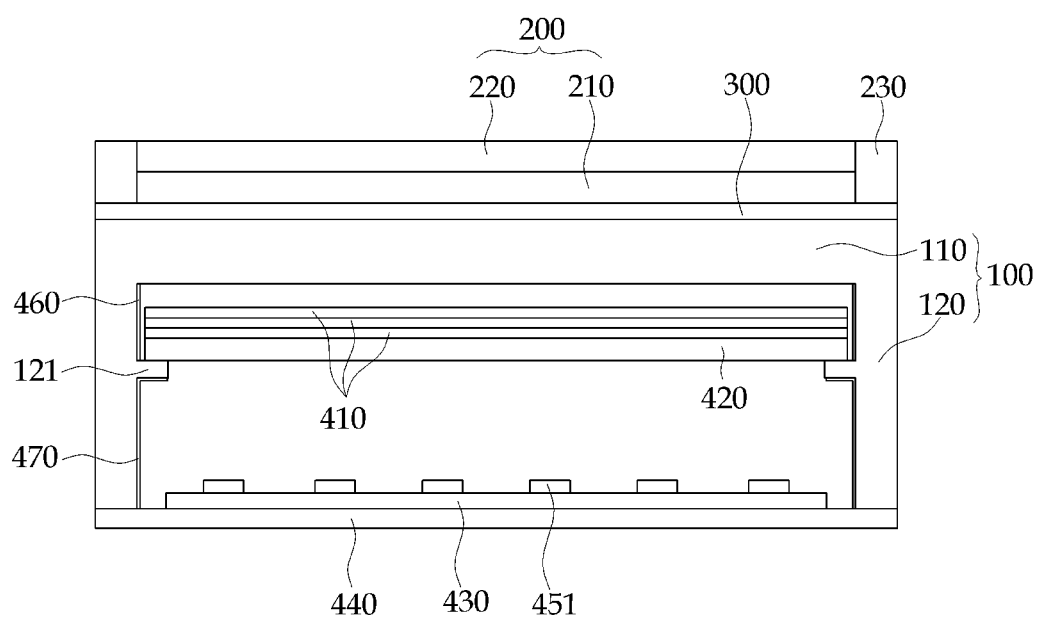
FIG. 3 is a cross-sectional view illustrating a display device according to another embodiment of the present invention.

FIG. 3 is a cross-sectional view illustrating a display device according to another embodiment of the present invention.

Referring to FIG. 3, the mold frame 100 further includes a supporting protrusion 121 on which a diffusion plate 420 and an optical sheet 410 are mounted. The supporting protrusion 121 protrudes from a side wall portion 120 of the mold frame 100 in a direction in parallel with the diffusion plate 420. The supporting protrusion 121 may be manufactured in a variety of forms that can stably fix the diffusion plate 420 and the optical sheet 410, other than the form disclosed in FIG. 3.

The mold frame 100 is made of a transparent polymer material, and thus a first reflective sheet 460 and a second reflective sheet 470 are disposed on the side wall portion 120 and the supporting protrusion 121. The first and the second reflective sheets 460 and 470, respectively, are configured to prevent a light leakage from side surfaces and to improve light extraction efficiency.

The bottom chassis 440 may be manufactured in a quadrilateral panel form as is the diffusion plate 420, and may be coupled to the side wall portion 120 of the mold frame 100.

Hereinafter, yet another embodiment of the present invention will be described with reference to FIG. 4. This embodiment of the present invention has the same configuration as the previously described embodiment of the present invention except for structures of mold frame 100 and bottom chassis 440. Therefore, repeated description will not be provided for ease of description.

Figure 4:
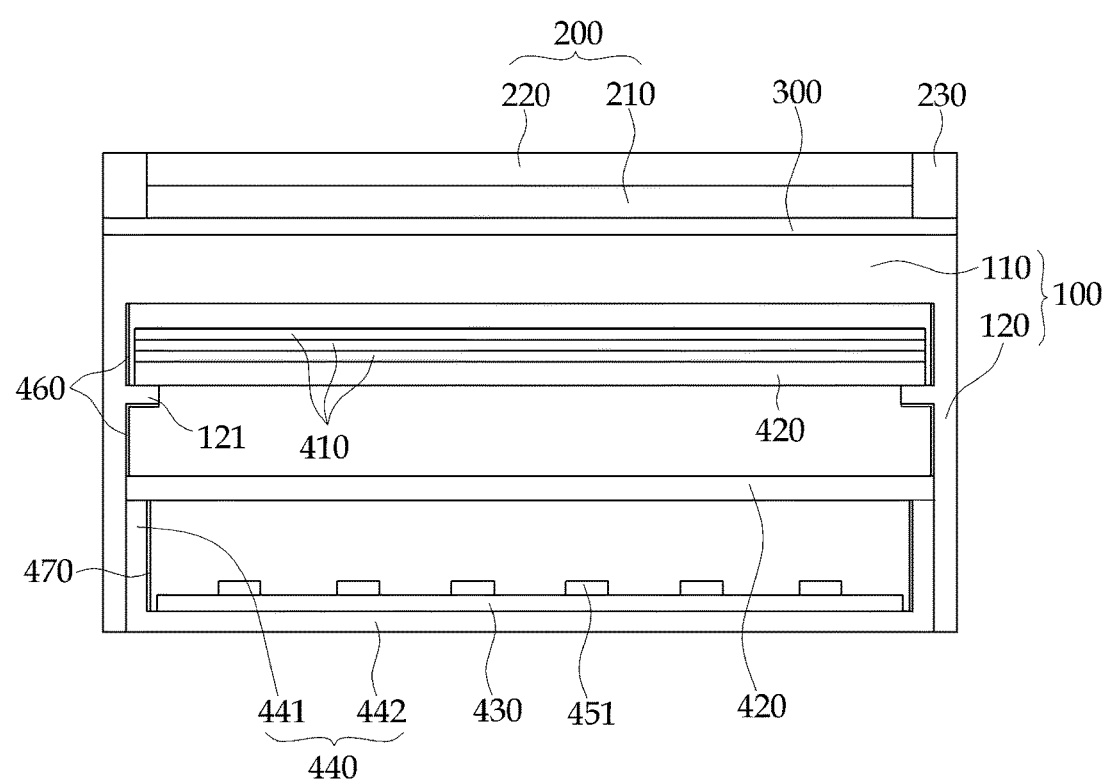
FIG. 4 is a cross-sectional view illustrating a display device according to yet another embodiment of the present invention.

FIG. 4 is a cross-sectional view illustrating a display device according to yet another embodiment of the present invention.

Referring to FIG. 4, a diffusion plate 420 is mounted on a protrusion 441 of the bottom chassis 440 and an optical sheet 410 is mounted on a supporting protrusion 121 of the mold frame 100.

A first reflective sheet 460 is disposed on a side wall portion 120 to prevent light leakage from side surfaces. A second reflective sheet 470 is disposed on the protrusion 441 of the bottom chassis 440 to improve light extraction efficiency.

From the foregoing, it will be appreciated that various embodiments in accordance with the present disclosure have been described herein for purposes of illustration, and that various modifications may be made without departing from the scope and spirit of the present invention. Accordingly, the various embodiments disclosed herein are not intended to be limiting with respect to the true scope and spirit of the present invention.

What is claimed is:

1. A display device, comprising:
   a display panel;
   a light source configured to supply light to the display panel;
   a mold frame on which the display panel is disposed;
   an optical sheet disposed between the mold frame and the light source and having a substantially the same shape as the display panel on a plan view; and
   a bottom chassis on which the light source is disposed, and which is coupled to the mold frame;
   wherein the mold frame comprises:
   a base unit which is disposed between the display panel and the optical sheet, and which has a panel form; and
   a side wall portion which is bent and which extends from the base unit,
   wherein an entire rear surface of the display panel is bonded to the base unit of the mold frame by an adhesive member.

2. The display device of claim 1, wherein the mold frame is formed of transparent polymers.

3. The display device of claim 1, wherein the display panel is disposed on the base unit.

4. The display device of claim 1, wherein the side wall portion is coupled to the bottom chassis.

5. The display device of claim 1, wherein the display device further comprises a reflective sheet disposed on the side wall portion.

6. The display device of claim 1, wherein the bottom chassis has a bottom portion and a protrusion which is bent and which extends from the bottom portion.

7. The display device of claim 6, wherein the protrusion is coupled to the side wall portion.

8. The display device of claim 6, wherein the display device further comprises a reflective sheet disposed on the protrusion.

9. The display device of claim 6, wherein the display device further comprises an optical sheet and a diffusion plate disposed between the mold frame and the light source.

10. The display device of claim 9, wherein at least one of the optical sheet and the diffusion plate is mounted on the protrusion.

11. The display device of claim 1, wherein the display device further comprises the optical sheet and a diffusion plate disposed between the mold frame and the light source.

12. The display device of claim 11, wherein at least one of the optical sheet and the diffusion plate is mounted on the bottom chassis.

13. The display device of claim 11, wherein the mold frame further comprises a supporting protrusion configured to support at least one of the optical sheet and the diffusion plate.

14. The display device of claim 1, wherein the display device further comprises an adhesive member interposed between the mold frame and the display panel.

15. The display device of claim 14, wherein the adhesive member is disposed between the base unit of the mold frame and the display panel.

* * * * *